Figure 78:
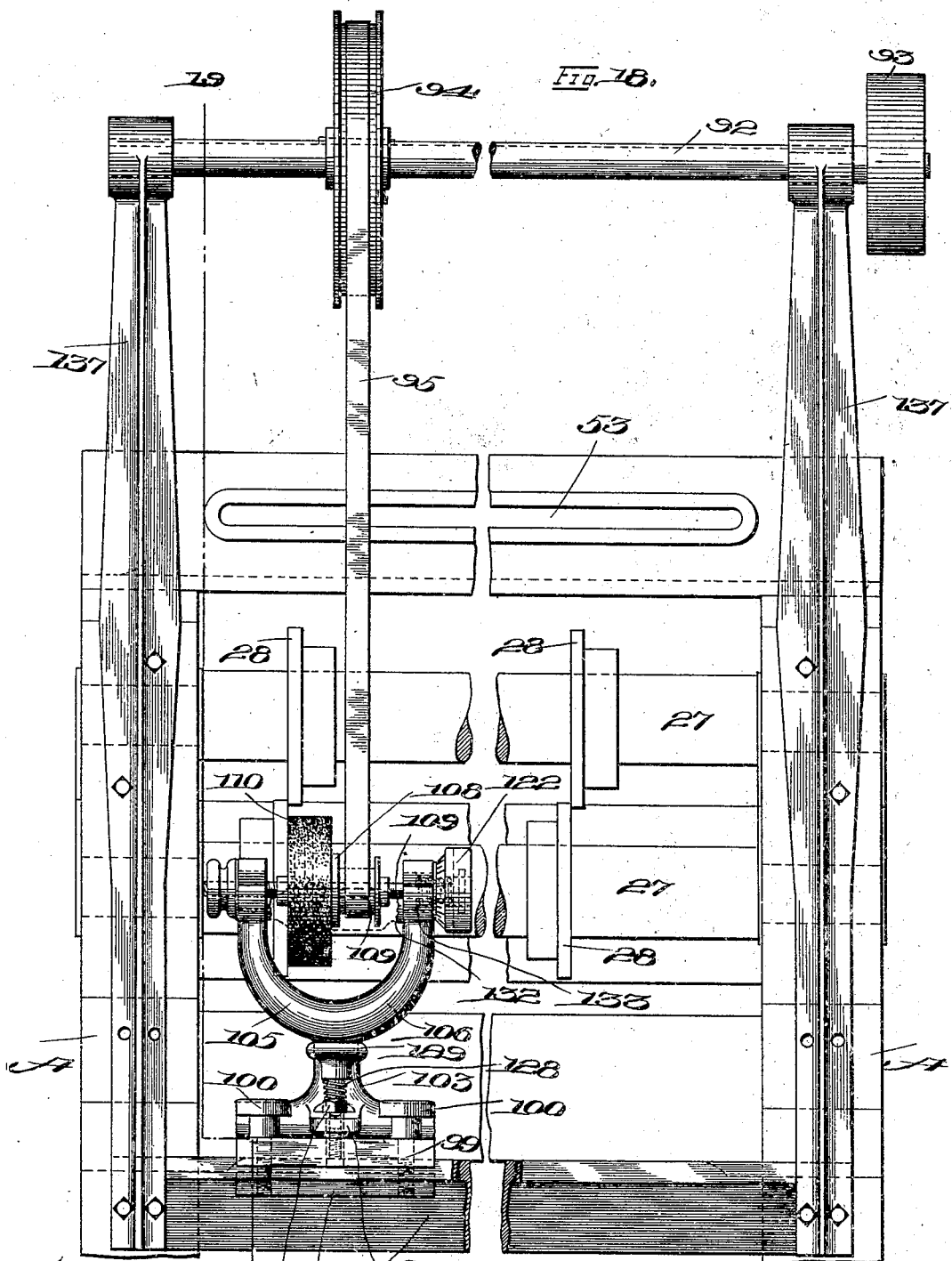

C. W. GRAHAM.
MACHINE FOR SLITTING OR TRIMMING BLANKS FOR CAN BODIES, &c.
APPLICATION FILED DEC. 1, 1903.
954,622.
Patented Apr. 12, 1910.
10 SHEETS—SHEET 1.
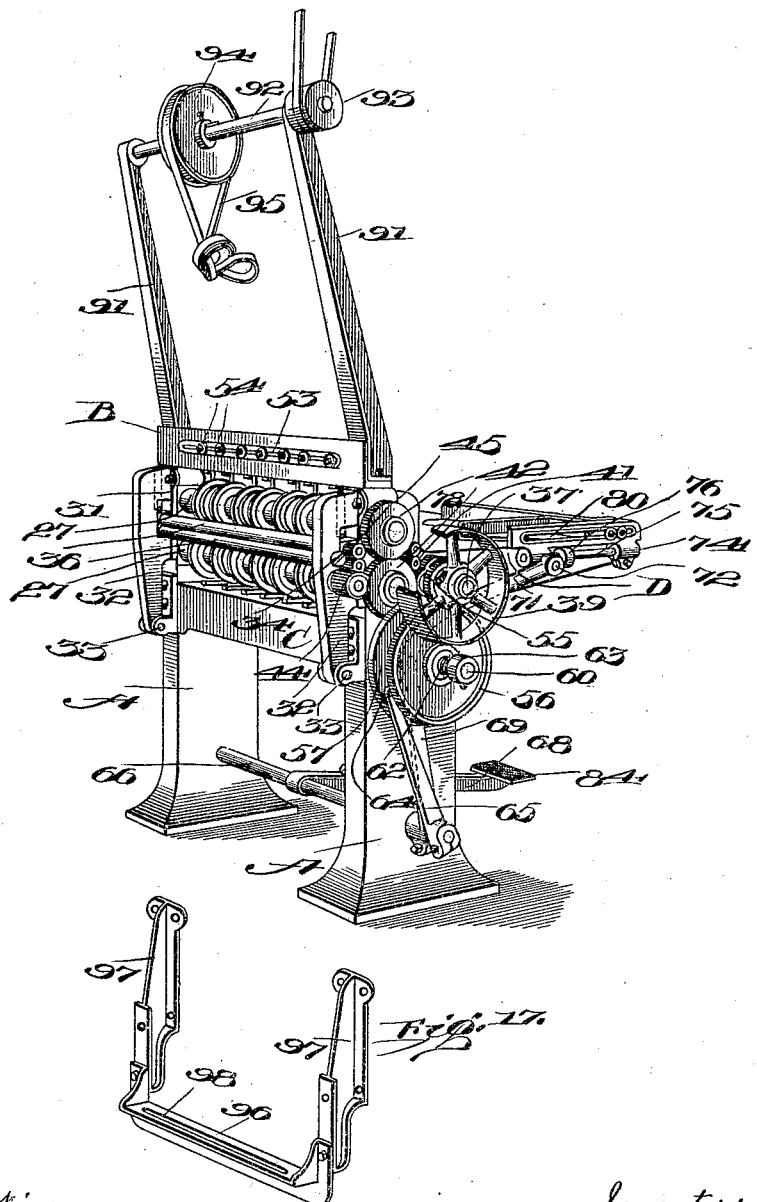

C. W. GRAHAM.
MACHINE FOR SLITTING OR TRIMMING BLANKS FOR CAN BODIES, &c.
APPLICATION FILED DEC. 1, 1903.
954,622.
Patented Apr. 12, 1910.
10 SHEETS—SHEET 2.
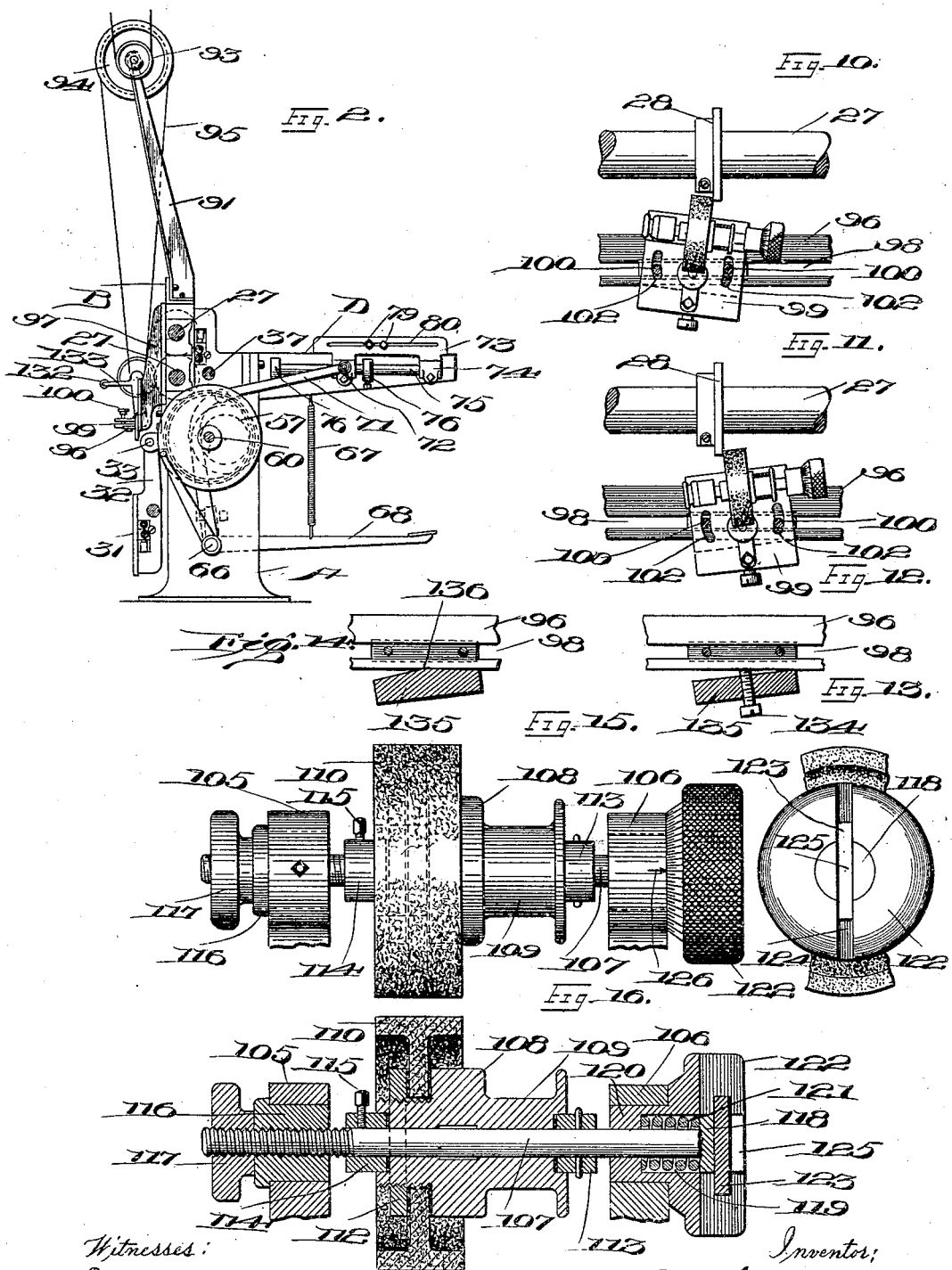

C. W. GRAHAM.
MACHINE FOR SLITTING OR TRIMMING BLANKS FOR CAN BODIES, &c.
APPLICATION FILED DEC. 1, 1903.
954,622.
Patented Apr. 12, 1910.
10 SHEETS—SHEET 3.
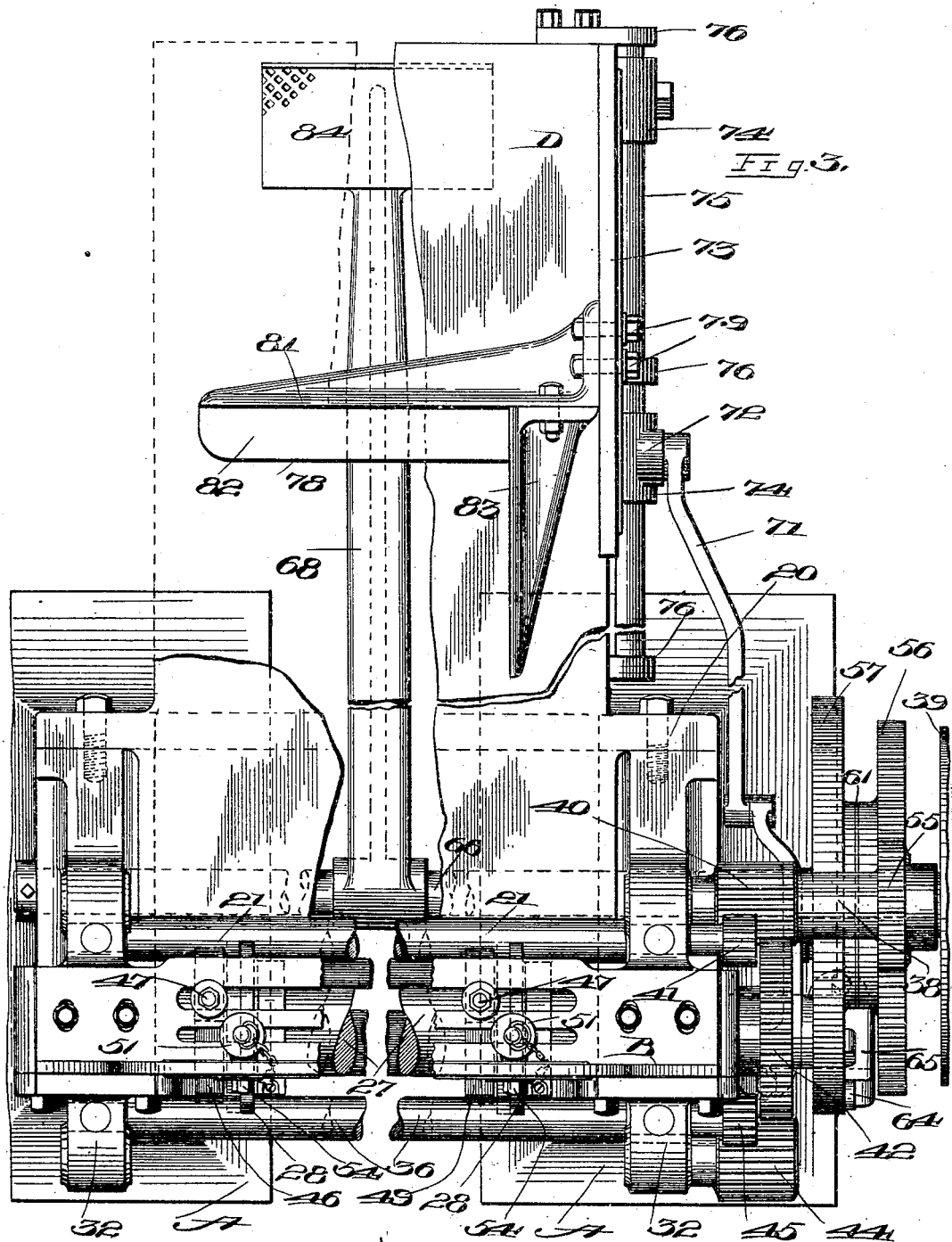

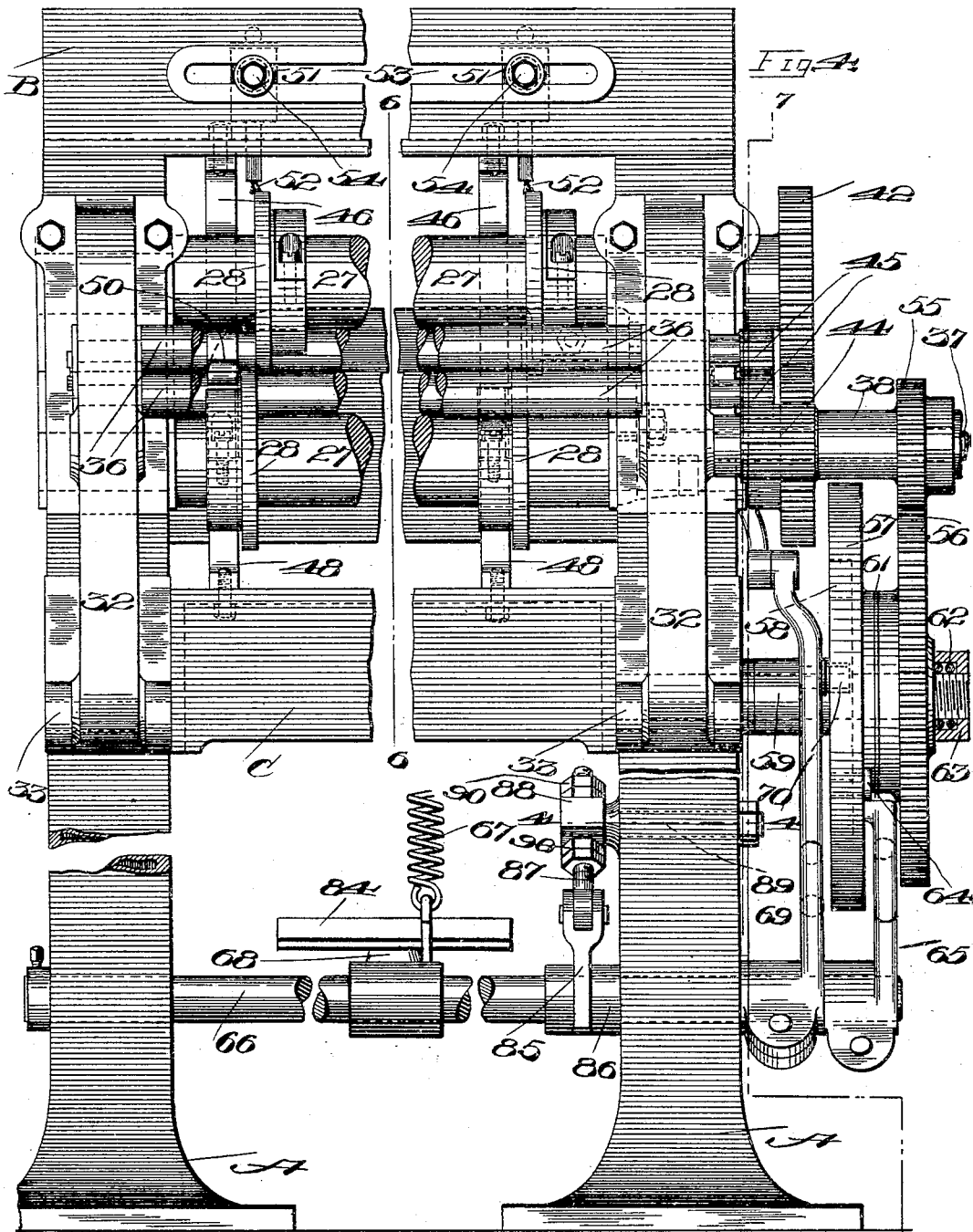

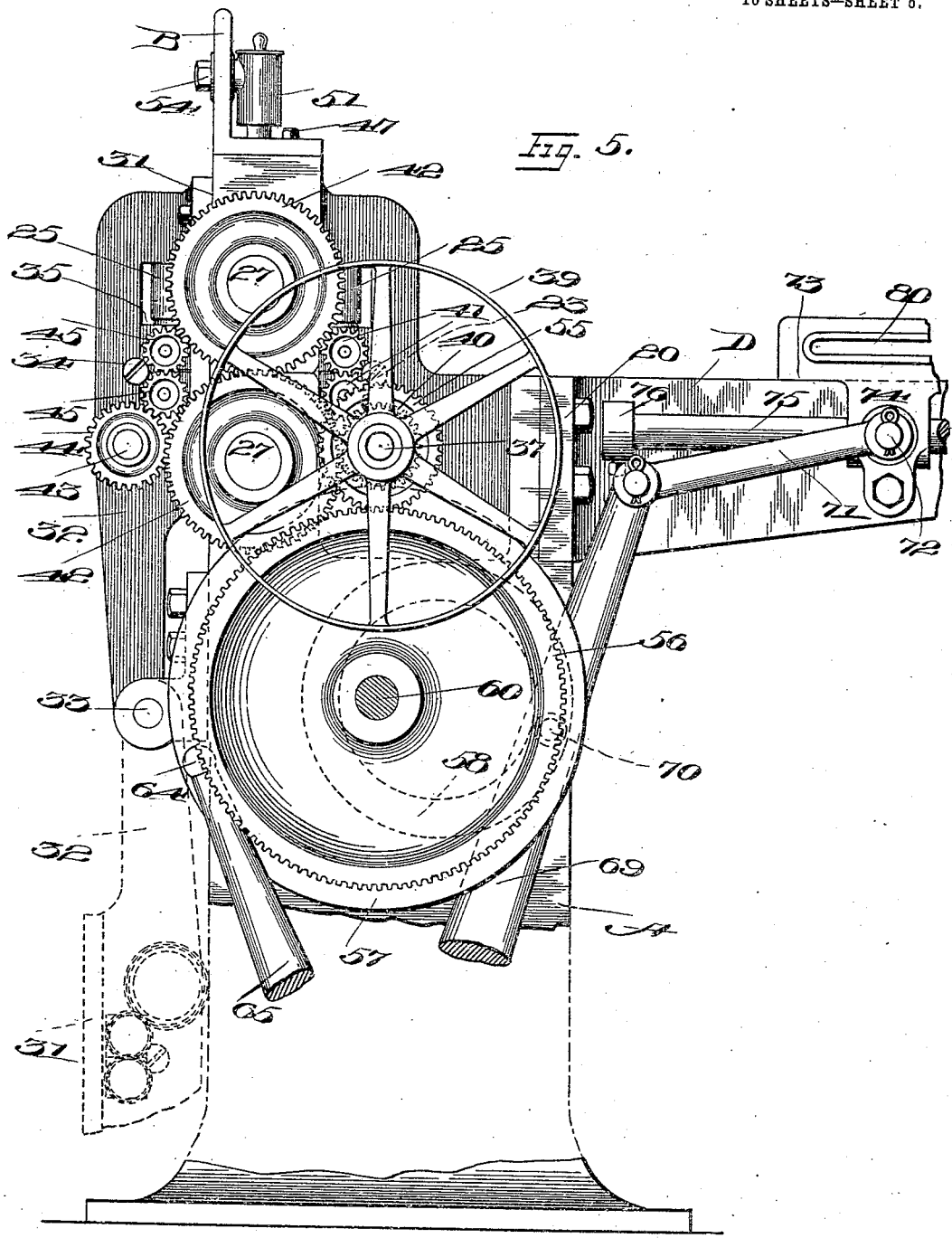

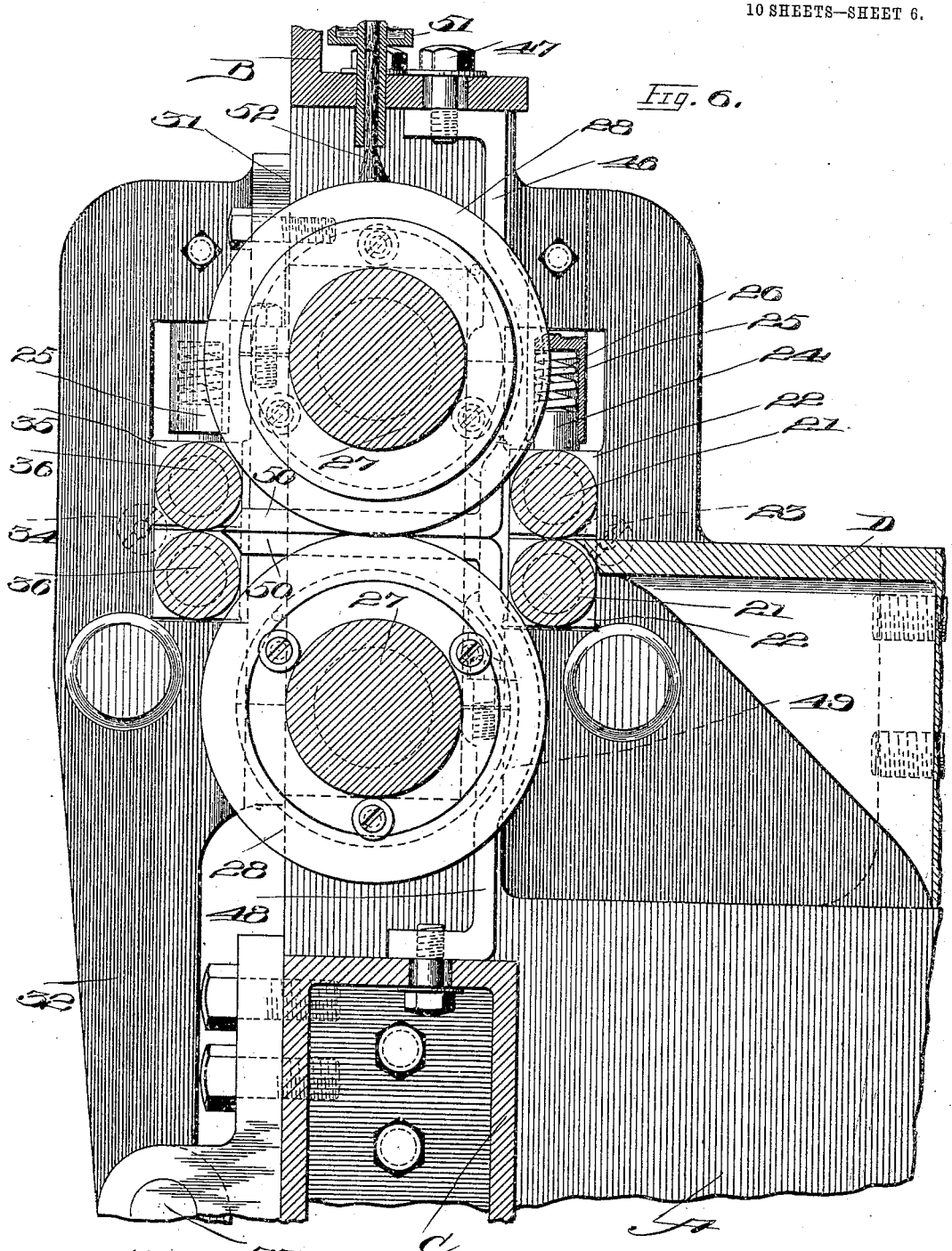

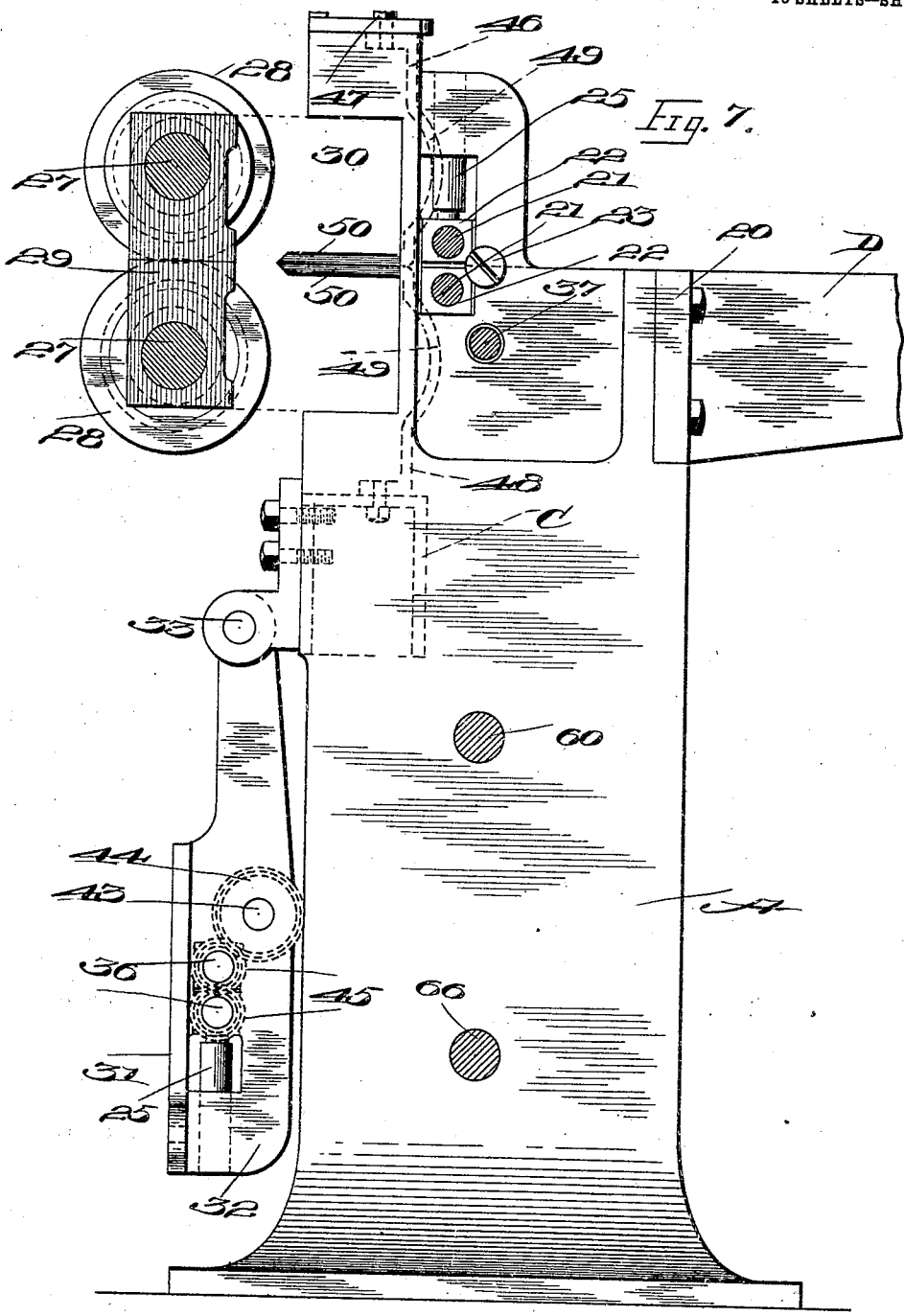

C. W. GRAHAM.
MACHINE FOR SLITTING OR TRIMMING BLANKS FOR CAN BODIES, &c.
APPLICATION FILED DEC. 1, 1903.
954,622.
Patented Apr. 12, 1910.
10 SHEETS—SHEET 8.
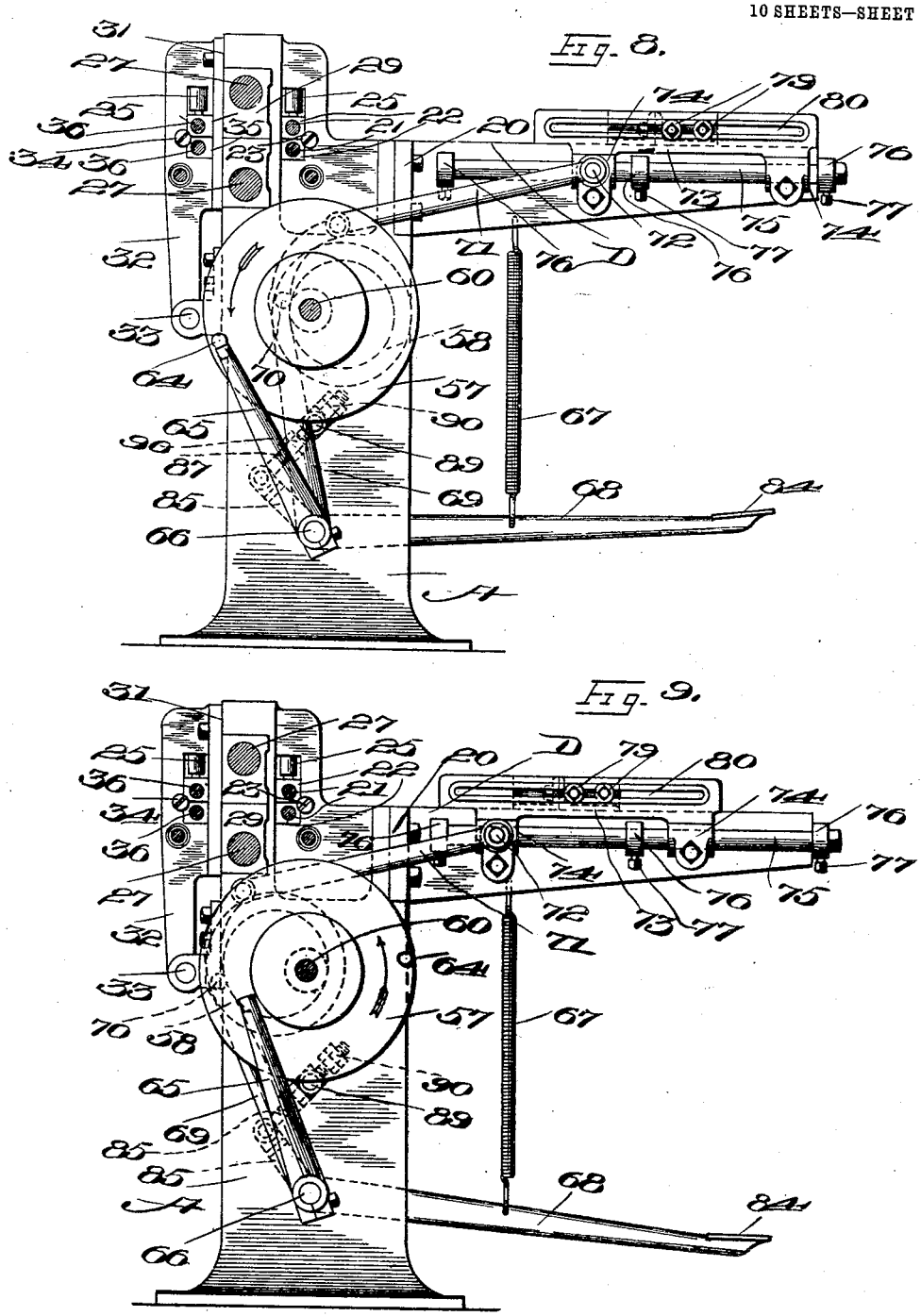

C. W. GRAHAM.
MACHINE FOR SLITTING OR TRIMMING BLANKS FOR CAN BODIES, &c.
APPLICATION FILED DEC. 1, 1903.

954,622. Patented Apr. 12, 1910.
10 SHEETS—SHEET 9.

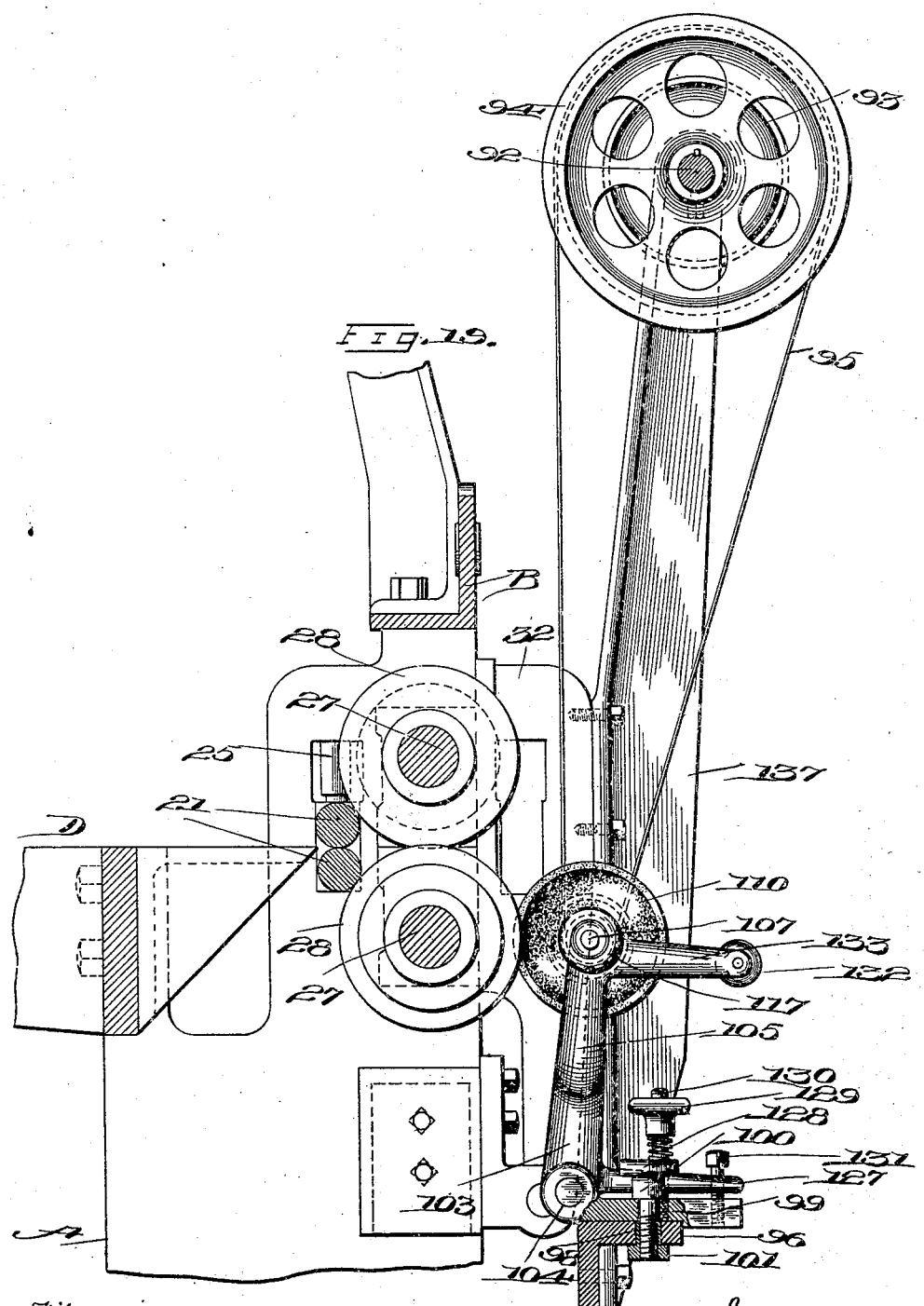

UNITED STATES PATENT OFFICE.

CHARLES W. GRAHAM, OF ROME, NEW YORK, ASSIGNOR TO UTICA INDUSTRIAL COMPANY, OF ROME, NEW YORK, A CORPORATION OF NEW YORK.

MACHINE FOR SLITTING OR TRIMMING BLANKS FOR CAN-BODIES, &c.

954,622. Specification of Letters Patent. Patented Apr. 12, 1910.

Application filed December 1, 1903. Serial No. 183,377.

*To all whom it may concern:*

Be it known that I, CHARLES W. GRAHAM, residing at Rome, in the county of Oneida and State of New York, have invented certain new and useful Improvements in Machines for Slitting or Trimming Blanks for Can-Bodies, &c., of which the following is a full, clear, and exact description, such as will enable others skilled in the art to which it appertains to make and use the same.

This invention relates to a blank slitting or trimming machine, especially adapted for slitting blanks to can body size from sheets of tin, but capable of use, both as to generic and specific features thereof, in a variety of relations. Its object is, in general, to improve the construction and efficiency of machines of this class.

More specific objects and advantages will appear hereinafter.

The invention accordingly consists in the features of construction, combinations of elements and arrangement of parts which will be hereinafter fully described and the novel features thereof pointed out in the claims.

In the embodiment of the invention as illustrated in the accompanying drawings, Figure 1 is a perspective view of the machine as it appears when ready for use as a slitter. Fig. 2 is a side elevation showing the machine with the grinding attachment in position. Fig. 3 is a broken top plan, on an enlarged scale, of the parts shown in Fig. 1 with the counter shaft and supporting standards of the grinding attachment omitted. Fig. 4 is a broken end elevation, looking in the direction of the arrow of Fig. 3. Fig. 4ª is a sectional detail on substantially the line 4—4 of Fig. 4. Fig. 5 is a broken side elevation of the parts shown in Fig. 3. Fig. 6 is a section on an enlarged scale on the line 6—6 of Fig. 4. Fig. 7 is a vertical section taken on a line corresponding to the line 7—7 of Fig. 4, showing the parts as they appear when the cutter shafts are removed. Fig. 8 is an end elevation with certain parts omitted and certain parts in section, illustrating certain details of the means for actuating the feed slide. Fig. 9 is a similar view, showing the parts in a different position. Figs. 10 to 16 inclusive are details of the construction and mounting of the grinding attachment. Fig. 17 is a perspective of the support for the grinding attachment. Fig. 18 is a broken end elevation, showing the grinding attachment in position, with a modification in the means for supporting it. Fig. 19 is a section on line 19—19 of Fig. 18.

Similar reference characters refer to similar parts throughout the several views.

The machine comprises, broadly,—means for feeding blanks or skelps, which are to be subdivided or trimmed, to the cutter shafts,—a mounting of the cutter shafts and means for driving them such that they may be readily removed from the machine without disorganization thereof,—and a grinding fixture adapted to be attached to the machine such that the cutters may be ground while in position.

The framework of the machine comprises standards A, A, an upper angle iron tie bar B, and an intermediate box section tie bar C. These tie bars serve the double purpose of connecting the standards and affording points of support for auxiliary devices, as the gages and lubricators hereinafter described, thereby providing a frame of compact construction which does away with all superfluous platforms, braces or the like such as are commonly used in machines of this class. A bed plate D is bolted to the standards, as best shown in Fig. 3, by means of screws extending through flanges on the bed plate as at 20 and thus acts as a further means for connecting and strengthening the two independent standards.

In operative relation to the inner end of the bed plate is a first pair of feed rolls 21, 21 which have their boxes 22 carried in suitable housings in the standards A, the boxes being held therein and prevented from working out longitudinally by a holding screw as at 23. The boxes may be provided, if desired, with a tension device to regulate the friction or bite between the two rolls, as by plungers 24 working in a guide 25 and held against the boxes by the force of the spring 26. Cutter shafts 27 carrying rotary cutters 28 are journaled at their ends in boxes 29 which, as best shown in Fig. 7, are adapted to be held in housings on the standards, said housings being formed by recessing or cutting out the standards as at 30 to surround the three sides of the boxes, so that the shafts with their boxes may readily slide in and out sidewise when it is desired to remove them for the purpose of inserting other shafts, of grinding the cutters, or for any other purpose. The boxes are held to position in the standards and the housings are completed by the flat faces of brackets 32, 32 which are pivoted to the standards, as at 33 and adapted to be swung down about their pivots, as in Fig. 7, to permit the removal of the cutter shafts or to be secured in position, as in Figs. 5 and 6, to hold the shafts in place. The brackets 32 are also provided with housings in which are secured, preferably by means of a holding screw 34, so that they may be removed longitudinally, the boxes of a second or feeding out pair of feed rolls 36, 36, positioned to receive the work as it leaves the bite of the cutters. It will thus be seen that by swinging the two brackets—which are connected by the feed rolls—down into the position shown in Fig. 7, the housings of the cutter shafts are opened, leaving the cutter shafts free to be removed or manipulated in any desired way without further loosening or removal of parts or other operations. The advantages of such a construction will be obvious. Tracing the transmision of power as shown, it will be further seen that the swinging down of the brackets 32 and the removal of the cutter shafts may be effected without in any way disarranging the means for driving the various shafts, and the construction which renders this possible forms an important feature of the present invention. A stud shaft 37 projecting from one of the standards A provides a bearing for a sleeve 38, which carries at one end a pulley 39 driven from any suitable source of power, and at the other end a comparatively wide gear 40 meshing with one of the set of mating gears 41, 41 on the adjacent ends of the first pair of feed rolls 21 and with one of a set of mating gears 42, 42 on the cutter shafts. A stud 43 projecting from one of the brackets 32 provides a bearing for a similar wide gear 44, which meshes with one of a set of mating gears 45, 45 on the second or feeding out pair of feed rolls 36 and with one of the cutter shaft gears 42. Thus the feed rolls and cutter shafts are driven in unison, the power being supplied to an auxiliary gear or pinion instead of directly to the cutter shafts as in the usual construction. Such a construction increases the efficiency of the transmision of power and the general compactness of the machine, while at the same time, as already stated, the cutter shafts may be readily removed from the machine without necessitating any manipulation of the power transmission elements, and replaced without readjustment thereof.

Looking toward the same end of convenience and facility of removing and replacing parts, I provide gages coöperating with the cutters to guide the sheets or blanks in their passage through the machine, which, however, are supported entirely from the rear of the cutter shafts so that such shafts may be removed and replaced without interfering in any way with the adjustment of the gages. This feature of invention may be most clearly seen upon inspection of Figs. 6 and 7, and it is important, as it allows the adjustment of the gages once determined to remain fixed, obviating the loss of time, inconvenience and possible inaccuracy which results from the use of constructions wherein it is necessary to reset the gages upon removing and replacing the cutter shafts. As shown, the gages are in pairs, of which the upper members 46 are adjustably connected to the upper tie bar B, as by the bolts 47 passing through elongated slots therein, while the lower gages 48 are similarly adjustably supported by the intermediate tie bar C. From their points of support the gages extend to the rear of the cutter shafts, being preferably curved therearound for the purpose of compactness as at 49, and extending forward as at 50 between the cutter shafts to a suitable point adjacent the feeding out rolls. Thus while the gages are readily adjustable and the upper and lower gages are independent of each other their position and adjustment is independent of the position or movement of the cutter shafts.

A series of lubricating cups 51 are provided with depending wicks 52 adapted to contact with the cutters on the cutter shaft, and these cups are mounted so that they may be adjusted to suit the adjusted position of the cutters by pins working in the longitudinal slot 53 in the upper tie bar and carrying clamp nuts 54.

The feed slide and the connections thereto are so arranged that the feed may be either an automatic one, under the control of the operator through a treadle, or the power may be supplied directly from the treadle. The automatic feed connections are so arranged that the automatic feed can be made as powerful as desired, or, by proper adjustment and slight manual retardation, converted into a delinquent automatic feed, thus placing within the power of the operator means of automatically feeding the machine at any desired speed without in any way altering the regular speed of the machine. Such features of construction form an important part of this invention and they are embodied as shown in the present illustration as follows:—Carried by sleeve 38 already referred to is a second gear 55 which meshes with gear 56, the hub of which forms one of the members of a friction clutch through which power is supplied under the control of the operator for reciprocating the feed slide. The other member of the clutch comprises a disk 57 having a cam or eccentric slot 58 in the inner face thereof, said disk being carried by a sleeve 59 revolubly mounted upon a stud shaft 60, the driven gear 56 being similarly mounted upon the same shaft and being under spring tension tending to force it toward the cam disk, a washer 61 being preferably interposed between the two members such that when the gear 56 is driven the cam disk will be carried therewith unless it is held from rotation. The two parts of the clutch mechanism are forced together, preferably by a spiral spring 62 surrounding the outer end of the stud shaft 60 abutting at one end against the hub of the gear 56 and at the other end against the cap 63, by adjusting which upon the threaded outer end of the stud shaft the tension of the spring 62 and the strength of the clutch may be varied. A stop pin 64 is suitably positioned on the cam disk and a trip lever 65, secured to the treadle shaft 66 extending between the two standards, is normally held beneath the pin by means of a spring 67 acting upon the treadle arm 68.

When the parts are in the position shown in Fig. 8 with the trip lever 65 beneath the pin 64 the cam disk will be held from rotation with the continuously driven gear. When the treadle is depressed, as by the foot of the operator, the trip lever is thrown to the position shown in Fig. 9 and the cam disk will then be carried with the gear under the influence of the clutch. A lever 69 loosely mounted upon the treadle shaft 66 carries a roller 70 which projects into the cam or eccentric slot in the disk 57 thereby oscillating the lever as the cam disk is rotated. A connecting rod 71 is pivotally connected to the upper end of this lever and to a stud 72 carried by one of the members of the feed slide, as the casting 73 the lower face of which is supported on the edge of the bed to slide therealong. Such mounting of the feed slide on the side of the bed plate enables the use of a bed having a smooth and unbroken surface. The feed slide, which term may be used generally to apply to the slide proper or member 73 and the arm or arms carried thereby, is guided and steadied in its movement so as to insure and maintain parallelism of the feed arm relative to the feed rolls by the sleeves 74, 74 connected to the slide which surround and have a sliding bearing upon the guide rod 75 mounted in bracket bearings 76 connected to the side of the bed plate. For convenience in assembling the guide rod is held to its bearings by means of set screws 77, and the throw of the slide which will be permitted by the distance between the bearings 76 must, of course, correspond to the desired stroke of the table regulated by the throw of the eccentric.

As best shown in Fig. 3, a rear feed arm 78 is adjustably mounted with relation to the sliding side member 73 by means of bolts 79 which pass through the longitudinal slot 80 in said sliding member. The rear feed arm carries a vertical flange 81 and a horizontal flange 82. A side feed arm 83 is mounted on the feed arm and may, if desired, be connected thereto by a similar longitudinal slot and bolt connection. The sheets to be slit or trimmed are fed by an attendant to the slide with their rear edges resting in the angle between the vertical and the horizontal flanges of the rear feed arm and their position transversely of the plate determined by the position of the side feed arm, and as the feed table reciprocates under the action of the oscillating lever 69, they are fed forward to the bite of the first pair of feed rolls. It will be seen that I thus provide a construction wherein the feed slide will be automatically reciprocated so long as the treadle is depressed to carry the trip lever 65 away from the stop on the cam disk and thereby permit the normal action of the friction clutch. The action of the feed slide may, as already noted, be made very powerful or may be so regulated by adjusting the tension on the spring 62 that the automatic movement of the slide may be controlled and regulated by the hand of the operator resting thereon. The feed may be changed from an automatic to a manual or treadle feed by removing the cam roller 70 from the lever 69 and clamping the sleeve which carries said lever to the treadle shaft instead of allowing it to rock loosely thereon. The removal of the roller breaks the connection between the feed slide and the power or automatic drive and the table may then be reciprocated by pumping the treadle 84. An adjustable stop mechanism is provided which limits the movement of the treadle shaft and treadle whether used for applying power for the foot feed or for throwing off the trip lever for the automatic feed. This comprises, as best illustrated in Figs. 4 and 4ª, an arm 85 connected to a collar 86 rocking with the shaft 66 and pivotally connected to a pin or rod 87 which passes through an opening in the head 88 of a rod or bolt 89 loosely mounted in one of the side standards A for rotation with reference thereto. The rod 87 is threaded and carries adjusting nuts 90 on each side of the bolt head. During the automatic operation of the machine, these stops tend to limit the movement of the rock shaft and of the trip lever such that when the foot of the operator is removed from the treadle and the treadle arm is left free to swing under the influence of the spring 67, the trip lever will be carried to proper position in the path of the stop pin 64, thereby throwing the automatic feed out of operation. When the connections are set for the treadle feed the position of the stops will determine the limit of movement of the feed slide and prevent too great a movement thereof in either direction.

The construction shown in Figs. 8 and 9, wherein the oscillating lever 69 by which the feed table is reciprocated travels to and fro on that side of the center of the cam disk away from the feed table rather than on that side nearer the feed slide, as in the construction shown in Fig. 5, is preferable in that the movement of the feed slide as regulated by the eccentricity of the slot is such that while the feed slide is in its rear position and the sheets are being fed thereto its movement is comparatively slow, giving sufficient time for the attendant to place the sheets properly in position thereon, while its movement at the other end is a more rapid one. Thus time is economized by giving a quick stroke of the slide at the feeding in point and a comparatively slow stroke at the point where it is supplied with stock. Obviously, however, the conditions might be reversed by change of position of the cam slot with reference to the cam disk, as shown in Fig. 5.

In a machine of this character a means for grinding or truing the cutters while still in position in the machine is an essential part of the organization, and necessary in order that the other elements of the machine may be efficiently and economically used as such. For this purpose I provide a grinding fixture, illustrated in Figs. 1 and 2 and 10 to 19 inclusive, the fixture being itself alike in these views but the method of mounting it in operative relation to the cutters being somewhat modified in Figs. 18 and 19. In the preferred form of mounting, as shown in Figs. 1 and 2, standards 91 are provided which are secured to the upper tie bar B in such a position that they do not interfere with any of the other parts of the machine and may remain permanently in position thereon. These standards are provided with bearings for a shaft 92 carrying a pulley 93 adapted to be driven from any suitable source of power. Mounted on this shaft, preferably so as to be adjustable longitudinally thereof, as by spline connection, is a driving pulley 94 from which power is transferred, as by the belt 95, to a pulley in connection with the grinding wheel. The grinding fixture proper is adapted to be mounted in operative relation with reference to the cutters on either cutter shaft upon a cross bar 96, best shown in Fig. 17, carried by two brackets 97 adapted to be bolted to the standards in place of the pivoted brackets 32, when these brackets are swung down away from the standards, as shown in Fig. 2. The flat inner faces of these brackets take the place of the inner faces of brackets 32 in completing the housings for the cutter shaft boxes and holding such shafts in place. The outer faces of the brackets 97 are provided each with two bolt holes so that the cross bar 96 may be mounted to bring the grinding fixture carried thereby in position to grind the lower set of cutters, or—by shifting the cross bar upward so that it may be secured at the upper bolt holes—in position to grind the upper set of cutters. The cross bar 96 is provided with a longitudinal slot 98 along which the grinding fixture may be moved and through which the fastening devices therefor pass. The base plate 99 of the grinding fixture is secured to the cross bar by means of set screws 100 which pass into a securing block 101 adapted to be moved along the longitudinal slot in the cross bar with the fixture. In order that the base plate of the fixture and the grinding wheel carried thereby may be swung to vary the angle of cut of the grinding wheel against the cutter, curved slots 102 are provided in the base plate through which the shanks of set screws 100 pass.

The frame 103 which carries the grinding wheel is pivotally mounted with relation to the base plate 99 as by trunnions 104 thereon suitably mounted in bearings on the base plate. At its upper end this frame is in the form of a yoke having arms 105, 106 on which is mounted a spindle or shaft 107. On this spindle is mounted to revolve freely thereon a hub 108 (Fig. 16), carrying a pulley 109 over which the belt 95 passes from the driving pulley above, and having a grinding wheel 110 detachably mounted thereon and held in position by the lock nut 112. The hub 108 is held in position with relation to the spindle by means of a collar 113 at one end pinned to the spindle and a collar 114 at the other end adapted to be adjustably secured thereto, as by the set screw 115. One end of the spindle is threaded and passes through a correspondingly threaded bushing 116 held to position in the arm 105 of the frame by a set screw 117. The other end of the spindle is provided with a head 118 adapted to seat in a recess 119 in the bushing 120, revolubly mounted in the arm 106 of the frame, the spindle being normally forced to the right by a spiral spring 121 bearing against the inner face of the head and the bottom of the recess in the bushing, this spring coöperating with the check nut 117 at the other end of the spindle to put a tension upon the spindle such that it will not be revolved by the normal friction of the hub 108 when the grinding wheel is in operation. The outer end of the bushing 120 is extended in diameter and knurled to provide a knob or handle 122 by which, after loosening the check nut 117, the spindle may be turned to adjust the spindle and the grinding wheel longitudinally of the supporting frame. For this purpose the spindle is constrained to turn with knob 122 by reason of a pin 123 passing through a kerf or saw cut in the spindle head, as at 124 and registering with a corresponding kerf 125 in the knob. If desired, the beveled inner edge of the handle may be provided with a scale reading in connection with an index on the bearing on the arm 106, as at 126 in order that any given rotation of the spindle and consequent longitudinal feed thereof and adjustment of the grinding wheel may be obtained.

Projecting from the frame 103 adjacent the axis thereof is an arm 127, and the rocking of the frame on its trunnions and the normal position thereof is regulated by the pressure of a spring 128 bearing against the upper face of said arm and adapted to be adjusted by the nut 129 on the upper end of a threaded stud 130 which passes through the spring and is tapped into the base plate. An adjustable and positive stop for the arm 127 may also be provided in the form of a headed screw 131 tapped into the base plate and passing loosely through the arm, the upper movement of said arm being limited by contact with the head of the stud, as best shown in Figs. 18 and 19.

As shown in Figs. 2 and 19, a handle 132 may be connected to the frame, as by an arm or arms 133, in a position to be grasped by the operator to move the grinding wheel frame on its axis toward and from the cutter shaft as desired in operation. I provide means for regulating the angle of cut of the grinding wheel upon the sides of the cutters so as to determine the angle of clearance given thereto when the base plate is swung with reference to the supporting bar by the construction already described, as follows: An adjustable fulcrum (best shown in Fig. 13) is provided for the swinging movement of the base plate as by a pivot screw 134 which passes through the ledge 135 overhanging the outer edge of the cross bar 96 and spaced a slight distance from its edge. When the fastening screws 100 are loosened the base plate may be swung about the point of this screw as a pivot until one end of the ledge contacts with the face of the cross bar, as shown in Fig. 13, whereupon the base plate may be secured in position. The angle of such swing and the consequent angle of cut of the grinding wheel may be readily adjusted by the adjustment of the pivot screw. While such an adjustable construction is preferable, the angle of clearance cut may be determined once for all, as shown in Figs. 14 and 19, by cutting away the inner face of the ledge 135 on both sides of the middle, leaving a point to serve as a pivotal point, as at 136. The angle to which this ledge is thus cut away will then determine the amount of swing which can be given to the base plate before the face of the ledge is brought flush with the face of the cross bar and the consequent angle of cut of the grinding wheel.

In the construction shown in Figs. 18 and 19 the cross bar 96 which supports the grinding fixture is carried by standards 137, in the upper ends of which are bearings for a shaft 92 carrying pulleys 93 and 94, as in the construction already described. With this construction the grinding fixture standards are secured in position without the necessity of swinging down the brackets 32 but must be removed when not in use. Otherwise the construction and operation is the same, it being noted, as shown in Fig. 19, that when the grinding fixture is mounted in this way the feeding out pair of feed rolls 36 should preferably be removed from the machine, this being done by removing the clamping screw 34 and drawing said feed rolls longitudinally from their housings.

It will thus be seen that I provide a grinding fixture which may be adjusted longitudinally of the cutter shafts to grind the different cutters, or may be adjusted vertically from one cutter shaft to the next, and a grinding wheel carried by such fixture which may be moved to any position toward or away from the cutter shafts and held in any desired point in such movement,—may be adjusted longitudinally with reference to its supporting frame or swung with reference to the cutters so as to grind the sides of the cutters to any desired angle of clearance, leaving their diameters constant so that the proportional speeds of the cutters and feed rolls will not vary, all these results being accomplished without the necessity for adjustment or manipulation of the means for driving the grinding wheel.

The fact which is peculiarly applicable to machines of this character will be obvious to those skilled in the art to which this invention relates, that various details of the construction here illustrated may be modified, both by changing the form of individual elements and the assembling of elements which might materially change the appearance of the machine or construction without involving a change in principle or departing from the scope of this invention.

The method of mounting the cutter heads and cutters upon the cutter shafts as shown herein is to be made the subject matter of another application and is not claimed in this application.

Having described my invention, what I claim as new and desire to secure by Letters Patent is:—

1. In a machine of the class described, in combination with the cutter shafts and the standards adapted to support the ends of said cutter shafts, an intermediate and an upper tie bar connecting said standards and serving in connection therewith as the framework of the machine, and gages adapted to coöperate with said cutter shafts supported by said tie bars.

2. In a machine of the class described, in combination with the cutter shafts and the standards adapted to support the ends of said cutter shafts, an intermediate and an upper tie bar connecting said standards and serving in connection therewith as the framework of the machine, gages coöperating with said cutter shafts supported by said upper and lower tie bars respectively, and a series of lubricating devices carried by one of said tie bars.

3. In combination with the tool carrying shafts, supports for the ends of said shafts provided with housings adapted to partly surround said shafts but such that the shafts may be removed directly from said housings without manipulation thereof, and brackets pivotally mounted upon said supports and adapted to hold the shafts to the housings.

4. In a machine of the class described, in combination with the cutter shafts and boxes therefor, supports for said boxes provided with housings partially surrounding said boxes, and brackets pivoted to said supports in position to complete the housings of said boxes, whereby upon swinging the brackets upon their pivots the cutter shafts and boxes may be free to be removed from the housings.

5. In a machine of the class described, in combination with the cutter shafts and boxes therefor, supports for said boxes, the sides of said supports being recessed to form housings within which the boxes may be slidably mounted, and brackets pivoted to the supports and adapted to hold said boxes to the housings.

6. In a machine of the class described, in combination with the cutter shafts and boxes therefor, supports for said boxes, said supports being recessed to form housings within which the boxes are slidably mounted, brackets pivotally mounted in connection with each of said supports and adapted to hold the boxes to the housings, and a pair of feed rolls coöperating with the cutter shafts supported at their ends in said brackets.

7. In a machine of the class described, in combination with the coöperating cutter shafts, supports therefor within which the boxes of said shafts are housed, brackets hinged to said supports and forming a part of said housings, and feed rolls adapted to coöperate with said cutter shafts carried by said brackets.

8. In a machine of the class described, in combination with the cutter shafts one of which carries a drive gear, and the feed shafts one of which carries a drive gear, means comprising a gear meshing with both of said drive gears adapted to drive said cutter and feed shafts.

9. In a machine of the class described, in combination with the coöperating cutter shafts provided with meshing drive gears and feed roll shafts provided with meshing drive gears, means comprising a gear meshing with one of said cutter shaft gears and one of said feed shaft gears adapted to drive said cutter and feed shafts.

10. In a machine of the class described, in combination, a pair of coöperating cutter shafts provided with intermeshing drive gears, a pair of feed roll shafts provided with intermeshing drive gears offset with respect to said first drive gears, and means comprising a single gear intermeshing with one of each of said sets of drive gears and adapted to drive the same.

11. In a machine of the class described, in combination, the frame members, the cutter shafts releasably mounted in housings in said frame members, means for driving said cutter shafts, brackets pivoted to said frame members and adapted to hold said cutter shafts to their housings, a pair of feed roll shafts carried by said brackets and an idler gear carried by one of said brackets and adapted to be driven from one of said cutter shafts and to drive said feed shafts.

12. In a machine of the class described, in combination with the frame, cutter shafts carrying drive gears and two sets of feed shafts carrying drive gears, a source of power, a gear driven from said source of power mounted on the frame meshing with one of said cutter shaft gears and with one of the drive gears of the first set of feed shafts and adapted to drive the same, and an idler gear carried by the frame and meshing with one of said cutter shaft gears and with one of the gears on the second pair of feed shafts.

13. In a machine of the class described, in combination with the frame and the cutter shafts mounted on said frame, a set of feed shafts on each side of said cutter shafts, means comprising a single gear meshing with gears on said cutter shafts and the first pair of feed shafts adapted to transmit power thereto, and means for driving the second pair of feed shafts from the cutter shafts.

14. In a machine of the class described, in combination with the frame members, the cutter shafts provided with partial housings in said frame members and the feed shafts and the gears on the ends of said shafts, the driven gear adapted to mesh with one of the cutter shaft gears and one of the first pair of feed shaft gears, a bracket pivoted to the frame and adapted to complete the housings of said cutter shafts, said bracket carrying the second pair of feed shafts, and an idler adapted to mesh with one of the feed shaft gears and one of the cutter shaft gears.

15. In a machine of the class described, in combination with a cutter shaft and a frame in which said cutter shaft is releasably mounted, a gage carried by said frame independently of said cutter shaft.

16. In a device of the class described, in combination with the frame provided with open housings and the cutter shafts having their boxes releasably mounted in said housings, the gages supported by said frame above and below said housings and extending about said shafts at the closed side of the housings and thence between said shafts in operative relation thereto, the construction and arrangement being such that the adjustment of the shaft in its housings may be effected without disturbing said gages.

17. In combination, a bed plate, a feed slide mounted for reciprocating movement thereon and a feed arm connected to said feed slide and extending transversely of said bed plate, said feed arm being provided with flanges extending respectively horizontally and vertically with reference to said bed plate.

18. In combination, a bed plate, a feed slide mounted for reciprocating movement thereon, a rear feed arm connected to said feed slide and extending transversely of said bed plate and a side feed arm extending longitudinally of said bed plate.

19. In combination, a bed plate, a feed slide mounted for reciprocating movement thereon, a rear feed arm connected to said feed slide and extending transversely of said bed plate, and a side feed arm extending longitudinally of said bed plate, also supported from said feed slide.

20. In combination, a bed plate, a feed slide mounted for reciprocating movement thereon, a rear feed arm connected to said feed slide and extending transversely of said bed plate, and a side feed arm extending longitudinally of said bed plate and carried by said rear feed arm.

21. In combination, a feed slide, a continuously driven member, connections between said feed slide and said continuously driven member for actuating said slide, a stop normally interposed in the train of said connections for breaking said connections, and a treadle connected to said stop to control the position thereof.

22. In combination, a feed slide, a continuously driven member, connections between said feed slide and said continuously driven member for actuating said slide, a stop normally interposed in the train of said connections for breaking said connections, a treadle connected to said stop to control the position thereof, and a spring controlling the normal position of said treadle.

23. In combination, a feed slide, a rock shaft, a lever mounted on said shaft and adapted to be connected to said slide, means for rocking said shaft, and a detachable means for automatically oscillating said lever.

24. In combination, a feed slide, a rock shaft, means for actuating said rock shaft, a lever connected to said feed slide and adapted to be mounted either rigidly or loosely upon said rock shaft, automatic means for oscillating said lever to actuate said slide, and means for throwing said automatic means out of action.

25. In combination, a feed slide, a rock shaft, means for actuating said rock shaft, a lever connected to said feed slide and adapted to be mounted either rigidly or loosely upon said rock shaft, automatic means for oscillating said lever to actuate said slide, and means controlled from said rock shaft for throwing said automatic means out of action.

26. In combination, a feed slide, a lever connected to said feed slide and mounted so as to be free for oscillation, a disk provided with a cam slot, a roller connected to said lever and projecting into said slot, a continuously driven member, a clutch connecting said driven member and said cam disk, and means under the control of the operator for throwing said clutch out of action.

27. In combination, a feed slide, a lever connected to said feed slide and mounted so as to be free for oscillation, a disk provided with a cam slot, a roller connected to said lever and projecting into said slot, a continuously driven member, a friction clutch connecting said driven member and said cam disk, and means under the control of the operator for throwing said friction clutch out of action.

28. In combination, a feed slide, a continuously driven member, connections between said slide and said continuously driven member for actuating said slide, a friction clutch interposed in said connections, and means for varying the friction between the members thereof.

29. In combination, a feed slide, a lever connected to said slide and mounted so as to be free for oscillation, a disk provided with a cam slot, a roller connected to said lever and projecting into said slot, a continuously driven member, a friction clutch connecting such continuously driven member and said cam disk, a pin connected to said cam disk, a trip lever adapted to be interposed in the path of said pin, and means under the control of the operator for controlling the position of said trip lever.

30. In combination, a feed slide, a lever connected to said slide and mounted so as to be free for oscillation, a rotatable disk provided with a cam slot, a roller connected to said lever and projecting into said slot, a continuously driven member, a friction clutch for connecting said continuously driven member and said cam disk, means for varying the power of said clutch, and means for preventing the operation of said clutch.

31. In combination, a feed slide, a lever connected to said slide and mounted so as to be free for oscillation, a disk provided with a cam slot and adapted to coöperate with a roller on said lever for oscillating the lever, a continuously driven member, a friction clutch for connecting said continuously driven member and said cam disk, a spring for controlling the power of said friction clutch, means for adjusting the tension of said spring, and means for stopping the rotation of said cam disk against the force of said clutch.

32. In combination, a feed slide, a lever connected to said slide and mounted so as to be free for oscillation, a disk provided with a cam slot adapted to coöperate with a roller on said lever for oscillating the lever, a continuously driven member, a friction clutch connecting said continuously driven member and the cam disk, a pin carried by the cam disk, and a stop adapted to be interposed in the path of said pin.

33. In combination, a feed slide, a lever connected to said slide and mounted so as to be free for oscillation, a disk provided with a cam slot adapted to coöperate with a roller on said lever for oscillating the lever, a continuously driven member, a friction clutch connecting said continuously driven member and the cam disk, a pin carried by the cam disk, a trip lever adapted to be interposed in the path of said pin, and means for controlling the position of said trip lever.

34. In combination, a feed slide, a lever connected to said slide and mounted so as to be free for oscillation, a disk provided with a cam slot adapted to coöperate with a roller on said lever for oscillating the lever, a continuously driven member, a friction clutch connecting said continuously driven member and the cam disk, a pin carried by the cam disk, a trip lever adapted to be normally interposed in the path of said lever, and means under the control of the operator for removing said trip lever from the path of said pin.

35. In combination, a feed slide, a lever connected to actuate said slide, a rock shaft upon which said actuating lever may be rigidly or loosely mounted, a detachable connection for automatically oscillating said lever, means controlled from said rock shaft for determining the operation of said automatic means, an adjustable stop device for limiting the throw of said shaft in either direction, and means for rocking said shaft.

36. In combination, a feed slide, a pivoted lever connected to actuate said slide, automatic means for oscillating said lever, a trip lever adapted to be interposed in the path of said automatic means, a rock shaft upon which said trip lever is mounted, a spring connected to said shaft tending to throw said trip lever into operation, and a stop connected to said shaft in position to prevent its movement beyond such point.

37. In combination, a feed slide, a pivoted lever connected to actuate said slide, automatic means for oscillating said lever, a trip lever adapted to be interposed in the path of said automatic means, a rock shaft upon which said trip lever is mounted, a spring connected to said shaft tending to throw said trip lever into operation, a stop connected to said shaft in position to prevent its movement beyond such point, and a treadle connected to said shaft whereby the shaft may be rocked against the force of said spring.

38. In combination, a feed slide, a lever connected to actuate said slide, a rotatable disk provided with a cam slot adapted to coöperate with a roller on said lever to oscillate the lever, a continuously driven member, a friction clutch connecting said continuously driven member to said cam disk, a stop pin carried by said cam disk, a rock shaft, a trip lever carried by said rock shaft and adapted to be interposed in the path of said pin, and means for rocking said shaft.

39. In combination, a feed slide, a lever connected to actuate said slide, a rotatable disk provided with a cam slot adapted to coöperate with a roller on said lever to oscillate the lever, a continuously driven member, a friction clutch connecting said continuously driven member to said cam disk, a stop pin carried by said cam disk, a rock shaft, a trip lever carried by said rock shaft and adapted to be interposed in the path of said pin, means for rocking said shaft, and an adjustable stop device limiting the throw of said shaft in either direction.

40. In combination, a feed slide, a pivotally mounted actuating lever connected to said slide, and a rotatable disk provided with a cam or eccentric slot adapted to coöperate with a part connected to said lever for oscillating said lever, said last-mentioned part being positioned in the portion of said slot of greatest eccentricity when said feed slide is in retracted position.

41. In combination, a feed slide, a pivoted lever connected to actuate said slide, a rotatable disk provided with a cam or eccentric slot adapted to coöperate with a part connected to said lever for oscillating the lever, the relation between said cam slot and the travel of the slide being such that the slide will be given a slower movement throughout those portions of its path of travel adjacent its retracted position than corresponding portions of its path of travel adjacent its advanced position.

42. In a machine of the class described, in combination with the frame and the cutter shaft mounted thereon, a grinding wheel, a movable support for said grinding wheel mounted upon said frame, means interposed between said frame and said support for maintaining said grinding wheel at a substantially fixed distance from said cutter shaft and in operative relation thereto, standards mounted upon said frame independently of the mountings for said cutter shaft, a driven shaft provided with bearings in said standard, and driving connections from said driven shaft to said grinding wheel.

43. In a machine of the class described, in combination with the frame and a cutter shaft mounted thereon, said cutter shaft being provided with a series of cutters spaced longitudinally thereof, a grinding wheel, a support for said grinding wheel movably mounted upon said frame, means interposed between said support and said frame for maintaining said grinding wheel at a substantially fixed distance from said cutter shaft and for maintaining it in operative relation to the cutters thereon, and means for adjusting said support for the grinding wheel longitudinally of said cutter shaft to bring it into operative relation with each of said cutters.

44. In a machine of the class described, in combination with the frame and a cutter shaft mounted thereon, said cutter shaft being provided with a series of cutters spaced longitudinally thereof, a grinding wheel, a support for said grinding wheel movably mounted upon said frame and longitudinally adjustable with relation to said cutter shaft and cutters, means coöperating with said support for maintaining said grinding wheel at a substantially fixed distance from said cutter shaft and in operative relation to the cutter, standards secured to said frame, a driven shaft provided with bearings in said standards, a pulley mounted on said shaft and longitudinally adjustable therealong, and a belt passing over said pulley over a pulley connected with said grinding wheel.

45. In a machine of the class described, in combination with the frame, a cutter shaft mounted thereon, said cutter shaft being provided with a plurality of cutters spaced longitudinally thereof, a grinding wheel, a support for said grinding wheel mounted upon said frame movable, toward and from said cutter shaft and also longitudinally adjustable with relation to said cutter shaft and cutters, means coöperating with said frame and said support for maintaining said grinding wheel at a substantially fixed distance from said cutter shaft and said cutters, standards secured to said frame independently of the mounting of said cutter shaft, a driven shaft provided with bearings in said standards, a pulley mounted on said shaft and longitudinally adjustable therealong, and a belt passing over said pulley and over a pulley connected to said grinding wheel.

46. In a machine of the class described, in combination with a frame having a plurality of cutter shafts mounted thereon, each shaft being provided with a plurality of spaced cutters, a grinding wheel, a longitudinally movable support for said grinding wheel mounted upon said frame and adjustable to bring said grinding wheel into operative relation with each of said cutters, and means engaging said support and tending to hold said grinding wheel at a fixed distance from said cutter shafts as said support is moved longitudinally over said frame.

47. In a machine of the class described, in combination with the frame and the cutter shaft mounted thereon, an auxiliary supporting bar mounted on said frame, said bar being provided with a slot extending longitudinally thereof, a grinding wheel mounted on said bar and fastening devices adapted to secure said grinding wheel at various points along said slot.

48. In a machine of the class described, in combination, a frame, a plurality of cutter shafts journaled thereon and provided with cutters longitudinally spaced along the same, a grinding wheel, a support for said grinding wheel movably mounted upon said frame and adjustable in a direction parallel to said cutter shafts, means engaging said support and tending to hold said grinding wheel at a substantially fixed distance from said cutter shafts as the same is moved longitudinally with respect thereto, adjustable means for engaging said support for holding said grinding wheel in operative relation with respect to said cutter shafts, and means adapted to transmit power to said grinding wheel at any point of its adjustment.

49. In a machine of the class described, in combination, a frame, a cutter shaft journaled thereon and provided with cutters longitudinally spaced along the same, a grinding wheel mounted upon said frame and mounted to swing toward and away from said cutter shaft in a plane at an acute angle therewith, and means adapted to adjust the mounting of said grinding wheel to vary said angle.

50. In a machine of the class described, in combination with the frame and a plurality of cutter shafts mounted thereon, brackets detachably secured to said frame, a bar supported by said brackets, a grinding wheel carried by said bar, and adjustable means for supporting said bar upon said brackets in a plurality of positions whereby said grinding wheel may be held in operative relation to each of said cutter shafts.

51. In a machine of the class described, in combination with the frame, a plurality of cutter shafts mounted thereon, brackets detachably secured to said frame, a bar supported by said brackets, a grinding wheel carried by said bar and adjustable longitudinally thereof, and adjustable means for supporting said bar upon said brackets in a plurality of positions whereby said grinding wheel may be held in operative relation to each of said cutter shafts.

52. In a machine of the class described, in combination with the frame, a cutter shaft provided with partial housings in said frame, brackets pivoted to said frame and adapted to complete the housings of said shaft, supplementary brackets adapted to be secured in position in place of said pivoted brackets to complete said housings, a bar supported by said supplementary brackets, and a grinding wheel carried by said bar.

53. In a machine of the class described, in combination, a frame, a cutter shaft provided with partial housings in said frame, brackets pivoted to said frame and adapted to complete the housings of said shaft, supplementary brackets adapted to be secured in position in place of said pivoted brackets to complete said housings, a bar adjustably supported by said auxiliary brackets, and a grinding wheel carried by said bar and adjustable longitudinally thereof.

54. In a machine of the class described, in combination with the frame, a cutter shaft mounted thereon, a supporting member secured to said frame, a base plate provided with elongated curved slots secured to said supporting member by means of set screws passing through said slots such that said base plate may be given a swinging movement with reference to said supporting member, stops for limiting said swinging movement in either direction and a grinding wheel carried by said base plate in operative relation to said cutter shaft.

55. In a machine of the class described, in combination with a frame, the cutter shaft carrying a rotary cutter, a support mounted on said frame, a grinding wheel carried by said support, means adapted to permit said support to be given a swinging movement with relation to said cutter shafts, and a stop for limiting said swinging movement.

56. In a machine of the class described, the combination with a frame, the cutter shaft carrying a rotary cutter, support mounted upon said frame, a grinding wheel carried by said support, means adapted to permit said support to be given a swinging movement with relation to said cutter shaft, and stops for limiting said swinging movement in both directions.

57. In a machine of the class described, in combination with the frame, the cutter shaft carrying a rotary cutter, a grinding wheel mounted on said frame and adapted for swinging movement with relation to said cutter, stops for limiting said swinging movement in either direction, and means for adjusting the point at which said stops become operative as such.

58. In a machine of the class described, in combination with the frame, the cutter shaft carrying a rotary cutter, a supporting bar mounted on said frame, a base plate mounted on said supporting bar for swinging movement with reference thereto, a ledge connected to said base plate and overhanging said supporting bar, and a member carried by said ledge adapted to act as the center of such swinging movement.

59. In a machine of the class described, in combination with the frame, the cutter shaft carrying a rotary cutter, a supporting bar mounted on said frame, a base plate mounted on said supporting bar for swinging movement with reference thereto, a ledge connected to said base plate and overhanging said supporting bar, a member carried by said ledge adapted to act as the center of such swinging movement, and means for adjusting the position of said member with relation to said ledge.

60. In a machine of the class described, in combination with the frame, the cutter shaft carrying a rotary cutter, a supporting member mounted on said frame, a grinding wheel mounted on said supporting member and adapted to swing on a pivotal center to vary the relation of said wheel to said rotary cutter, and means for adjusting the position of said pivotal center.

61. In a machine of the class described, in combination with the frame, the cutter shaft carrying a rotary cutter, a supporting member mounted on said frame, a grinding wheel mounted on said supporting member and adapted to swing on a pivotal center to vary the relation of said wheel to said rotary cutter, and stops on each side of said pivotal center adapted to limit said swinging movement in either direction.

62. In a machine of the class described, in combination with the frame, the cutter shaft carrying a rotary cutter, a supporting member mounted on said frame, a grinding wheel mounted on said supporting member and adapted to swing on a pivotal center to vary the relation of said wheel to said rotary cutter, stops on each side of said pivotal center adapted to limit said swinging movement in either direction, and means for adjusting the relation of said center to said stops.

63. In a machine of the class described, in combination with the frame, the cutter shaft carrying a rotary cutter, a supporting bar secured to said frame, a base plate mounted on said supporting bar for swinging movement with relation thereto, a grinding wheel mounted on said base plate in operative relation to said cutter, a ledge carried by said base plate overhanging said supporting bar, and a set screw passing through said ledge and bearing against said supporting bar adapted to serve for a pivotal center for the swinging movement of said base plate.

64. In a machine of the class described, in combination with the frame, the cutter shaft carrying a rotary cutter, a supporting bar secured to said frame, a base plate mounted on said supporting bar for swinging movement with relation thereto, a grinding wheel mounted on said base plate in operative relation to said cutter, a ledge carried by said base plate overhanging said supporting bar, a set screw passing through said ledge and bearing against said supporting bar adapted to serve for a pivotal center for the swinging movement of said base plate, and means for securing said base plate to said bar at any desired angle.

65. In a machine of the class described, in combination with the frame, the cutter shaft carrying a series of rotary cutters, a supporting bar secured to said frame, a base plate mounted on said supporting bar for swinging movement with relation thereto, a grinding wheel mounted on said base plate in operative relation to said cutter shaft, a ledge carried by said base plate overhanging said supporting bar, a set screw passing through said ledge and bearing against said supporting bar adapted to serve for a pivotal center for the swinging movement of said base plate, and means for securing said base plate to said bar and for adjusting said base plate longitudinally of said bar.

66. In a machine of the class described, in combination with the frame and a cutter shaft provided with a rotary cutter, a grinding wheel mounted on said frame in operative relation to said cutter, means for adjusting said grinding wheel in order that it may grind either side of said cutter, and means for swinging said grinding wheel with relation to said cutter to vary the angle of clearance cut.

67. In a machine of the class described, in combination with the frame, a cutter shaft provided with a rotary cutter, a grinding wheel mounted on said frame in operative relation to said cutter, means for adjusting said grinding wheel in order that it may grind either side of said cutter, means for swinging said grinding wheel with relation to said cutter to vary the angle of clearance cut caused thereby, and means for predetermining the limit of said swinging movement.

68. In a machine of the class described, in combination with the frame, a cutter shaft provided with a rotary cutter, a grinding wheel mounted on said frame in operative relation to said cutter, means for adjusting said grinding wheel in order that it may grind either side of said cutter, means for swinging said grinding wheel with relation to said cutter to vary the angle of clearance cut caused thereby, and means for securing the grinding wheel in position to fix the angle of cut.

69. In a machine of the class described, in combination with the frame, a cutter shaft provided with a rotary cutter, a grinding wheel mounted on said frame in operative relation to said cutter, means for adjusting said grinding wheel in order that it may grind either side of said cutter, means for swinging said grinding wheel with relation to said cutter to vary the angle of clearance cut caused thereby, means for predetermining the limit of said swinging movement, and means for securing the grinding wheel in position to fix the angle of cut.

70. In a device of the class described, in combination with the frame and the cutter shaft provided with a rotary cutter, a spindle mounted on said frame, a grinding wheel carried by said spindle in operative relation to said cutter, and means for adjusting said spindle longitudinally with relation to said wheel and cutter.

71. In combination with the frame and the cutter shaft, a spindle carrying a grinding wheel in operative relation to said cutter shaft, one end of said spindle being threaded, a correspondingly threaded member for supporting said end, and means for rotating said spindle to feed the grinding wheel longitudinally.

72. In combination with the frame and the cutter shaft, a spindle carrying a grinding wheel in operative relation to said cutter shaft, one end of said spindle being threaded, a correspondingly threaded bushing for supporting said end, means for rotating said spindle longitudinally with reference to said bushing, and a check nut for locking said spindle in position.

73. In combination with the frame and the cutter shaft, a grinding wheel spindle mounted on said frame, one end of said spindle being threaded, a correspondingly threaded member for supporting said spindle, a grinding wheel loosely mounted on said spindle for rotation with reference thereto, and means for putting said spindle under tension to prevent accidental rotation thereof.

74. In combination with the frame and the cutter shaft, a spindle mounted on said frame, one end of said spindle being threaded, a correspondingly threaded member for supporting said spindle, a grinding wheel loosely mounted on said spindle for rotation with reference thereto, a lock nut on the threaded end of said spindle, a head on the other end of said spindle, and a spring bearing against the inner face of said head tending to put the tension thereon in an opposite direction from that of the lock nut.

75. In combination with the frame and the cutter shaft, a spindle mounted on said frame, a grinding wheel loosely mounted on said spindle for rotation with reference thereto, one end of said spindle being threaded and passing through a correspondingly threaded supporting member, an adjusting knob through which the other end of said spindle passes, and connections between said spindle and said knob such that they may have independent longitudinal movement but rotate together.

76. In combination with the frame and the cutter shaft, a spindle mounted on said frame, a grinding wheel loosely mounted on said spindle for rotation with reference thereto, one end of said spindle being threaded and passing through a correspondingly threaded supporting member, an adjusting knob through which the other end of said spindle passes, a head on the end of said spindle, a recess in the inner face of said knob, and a spring seated in said recess and bearing against the inner face of the spindle head.

77. In combination with the frame and the cutter shaft, a spindle mounted on said frame, a grinding wheel loosely mounted on said spindle for rotation with reference thereto, one end of said spindle being threaded and passing through a correspondingly threaded supporting member, an adjusting knob through which the other end of said spindle passes, a head on the end of said spindle, a recess in the inner face of said knob, a spring seated in said recess and bearing against the inner face of the spindle head, and means for connecting said spindle and said knob so that they will be free for independent longitudinal movement but may be rotated together.

78. In combination with the frame and the cutter shaft, a spindle mounted on said frame, a grinding wheel loosely mounted on said spindle for rotation with reference thereto, one end of said spindle being threaded and passing through a correspondingly threaded supporting member, an adjusting knob through which the other end of said spindle passes, a head on the end of said spindle, a recess in the inner face of said knob, a spring seated in said recess and bearing against the inner face of the spindle head, a saw cut in the head of said knob, a corresponding saw cut in the spindle head, and a pin carried in the cut in the spindle head and projecting into the cut in the knob, substantially as described.

79. In combination with the frame and the cutter shaft, an auxiliary frame carrying a grinding wheel pivotally mounted on said frame so that it may be swung to and from said cutter shaft, a spring bearing against said frame adapted to control the normal position thereof, and continuously operative means adapted to drive said grinding wheel.

80. In combination with the frame and the cutter shaft, an auxiliary frame carrying a grinding wheel pivotally mounted on said frame so that it may be swung to and from said cutter shaft, a spring bearing against said frame adapted to control the normal position thereof, and an adjustable stop adapted to limit the movement of said frame.

81. In combination with the frame and the cutter shaft, an auxiliary frame carrying a grinding wheel pivotally mounted on the main frame for movement to and from the cutter shaft, a handle connected to said frame by which it may be so moved, a spring controlling the normal position of said frame, and continuously operative means adapted to drive said grinding wheel.

82. In combination, a feed slide, a continuously driven member, connections from said continuously driven member for reciprocating said slide and a treadle adapted to be operatively connected either for reciprocating said slide or for controlling the connections between said slide and said continuously driven member.

83. In combination, a feed slide, a continuously driven member, connections between said slide and said continuously driven member for reciprocating said slide, and means interposed in said connections such that the reciprocation of said slide may be manually controlled independently of the continuously driven member.

84. In combination, a feed slide, means for reciprocating said slide, and means whereby said slide may be made capable of manual retardation independently of said reciprocating means.

85. In combination, a feed slide, means for reciprocating said slide automatically, and means whereby said slide may be made capable of manual retardation independently of said reciprocating means.

86. In combination, a feed slide, a continuously driven member, and connections from said continuously driven member to said slide such that said slide may be given a variable feed without altering the speed of said continuously driven member.

87. In combination, a feed slide, a continuously driven member, connections between said slide and said continuously driven member for reciprocating said slide, and an adjustable means embodied in said connections for determining the power transmitted therethrough.

88. In combination, a feed slide, a continuously driven member, connections between said slide and said continuously driven member for reciprocating said slide, and a means embodied in said connections for determining the power transmitted therethrough, said means being capable of such adjustment that the slide may be manually retarded independently of the continuously driven member.

89. In a machine of the class described, in combination, a feed slide, a shaft having a cam mounted thereon, a pivotally mounted lever, a connection between said lever and said feed slide, and a part upon said lever engaging said cam upon the side of its shaft remote from said slide.

90. In a machine of the class described, in combination, a feed slide, a shaft, a cam mounted on said shaft, a lever pivotally mounted below said shaft, a connecting link between said lever and said feed slide, and a projection upon said lever engaging said cam upon the side of said shaft remote from said feed slide.

In testimony whereof I affix my signature, in the presence of two witnesses.

CHARLES W. GRAHAM.

Witnesses:
A. W. BURCH,
F. A. RIEGLER.